United States Patent
Valencia Reyes et al.

(10) Patent No.: US 12,309,022 B1
(45) Date of Patent: May 20, 2025

(54) RECOVERY OF DATA PROCESSING SYSTEMS USING OUT-OF-BAND METHODS

(71) Applicant: Dell Products L.P., Round Rock, TX (US)

(72) Inventors: Luis Antonio Valencia Reyes, Waxahachie, TX (US); Vinodkumar Vasudev Ottar, Mckinney, TX (US); Abeye Teshome, Austin, TX (US); Richard M. Tonry, Georgetown, TX (US); Bassem El-Azzami, Austin, TX (US); Mohit Arora, Frisco, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 16 days.

(21) Appl. No.: 18/425,282

(22) Filed: Jan. 29, 2024

(51) Int. Cl.
*H04L 41/0654* (2022.01)
*H04L 9/30* (2006.01)

(52) U.S. Cl.
CPC ........ *H04L 41/0654* (2013.01); *H04L 9/3073* (2013.01)

(58) Field of Classification Search
CPC .......................... H04L 41/0654; H04L 9/3073
See application file for complete search history.

(56) References Cited

U.S. PATENT DOCUMENTS

| | | | |
|---|---|---|---|
| 8,042,182 B2 | 10/2011 | Milani Comparetti et al. | |
| 8,615,785 B2 | 12/2013 | Elrod et al. | |
| 8,924,620 B2 | 12/2014 | Harriman et al. | |
| 9,215,244 B2 | 12/2015 | Ayyagari et al. | |
| 9,529,602 B1 * | 12/2016 | Swierk | G06F 9/45558 |
| 9,734,169 B2 | 8/2017 | Redlich et al. | |
| 10,176,308 B2 | 1/2019 | Mintz et al. | |
| 10,298,670 B2 | 5/2019 | Ben-Shaul et al. | |
| 10,671,765 B2 | 6/2020 | Swierk et al. | |
| 11,036,902 B2 | 6/2021 | Nicholas | |
| 11,102,122 B2 | 8/2021 | Seed et al. | |
| 11,134,380 B2 | 9/2021 | Fox et al. | |
| 11,487,274 B2 | 11/2022 | Valder et al. | |

(Continued)

FOREIGN PATENT DOCUMENTS

WO  WO-2024102715 A1 * 5/2024 ......... G06F 13/4045

*Primary Examiner* — Philip C Lee
(74) *Attorney, Agent, or Firm* — WOMBLE BOND DICKINSON (US) LLP (57) ABSTRACT

Methods and systems for managing a data processing system are disclosed. A management controller of the data processing system may identify an occurrence of a recovery event for the data processing system that may impair operation of hardware resources of the data processing system. The management controller may request a trusted recovery manager for the data processing system from a remote system via an out-of-band channel. Upon obtaining and validating the trusted recovery manager, the management controller may use the validated trusted recovery manager to perform a recovery process for the data processing system. Impacts of the occurrence of the recovery event on the hardware resources may be managed via the recovery process so that the data processing system is able provide computer-implemented services using the hardware resources.

20 Claims, 5 Drawing Sheets

(56) References Cited

U.S. PATENT DOCUMENTS

| | | |
|---|---|---|
| 11,792,267 B2 | 10/2023 | Kreiner et al. |
| 2011/0087387 A1 | 4/2011 | Safa-Bakhsh et al. |
| 2012/0266259 A1* | 10/2012 | Lewis .................... G06F 21/51 |
| | | 726/30 |
| 2013/0019239 A1* | 1/2013 | Fontignie ................. G06F 8/61 |
| | | 717/177 |
| 2014/0304497 A1* | 10/2014 | Park .................... G06F 9/4406 |
| | | 713/2 |
| 2017/0357515 A1* | 12/2017 | Bower, III ........... G06F 9/4411 |
| 2018/0039946 A1 | 2/2018 | Bolte et al. |
| 2018/0082065 A1* | 3/2018 | Liu ...................... H04L 9/3247 |
| 2018/0137284 A1* | 5/2018 | Oh ......................... G06F 21/64 |
| 2021/0034048 A1 | 2/2021 | Hajizadeh |
| 2021/0073211 A1 | 3/2021 | Wright, Sr. |
| 2021/0397716 A1* | 12/2021 | Kovah ................. H04L 9/3263 |
| 2022/0038659 A1 | 2/2022 | Michel |
| 2023/0246827 A1* | 8/2023 | Luciani, Jr. ........... G06F 9/4401 |
| | | 713/189 |

\* cited by examiner

RECOVERY OF DATA PROCESSING SYSTEMS USING OUT-OF-BAND METHODS

FIELD

Embodiments disclosed herein relate generally to managing data processing systems. More particularly, embodiments disclosed herein relate to systems and methods for managing recovery of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services. The computer-implemented services may be provided as a result of operation of hardware resources of the data processing system. The operation of the hardware resources may be managed by a management entity such as an operating system of the data processing system. Thus, the provision of the computer-implemented services may depend on the ability of the management entity to manage the operation of the hardware resources in an expected manner.

However, the management entity may be subject to failures, which may negatively impact the ability of the data processing system to provide the computer-implemented services. For example, hardware and/or software issues, power and/or network issues, human error, and/or a combination thereof may cause the management entity to become modified in a manner that impairs the management entity from managing the operation of the hardware resources in an expected manner. The failure may, for example, cause the management entity to become unrecoverable (e.g., corrupt); therefore, to restore the expected operation of the hardware resources (and the provision of the computer-implemented services), the management entity may be replaced.

To manage impacts of a failed management entity, a replacement management entity for the data processing system may be obtained from a remote entity. To do so, a data processing system may include and rely on hardware resources (e.g., in-band components of the data processing system) to perform actions to request, obtain, and/or verify (e.g., security of) the replacement management entity. However, if the in-band components are inoperable (e.g., due to the failure of the management entity and/or due to being unpowered), compromised (e.g., as part of an attack by a malicious party), then the in-band components may not be reliable to perform the actions.

Thus, desired operation of the data processing system may be restored using a trusted recovery manager. The trusted recovery manager may include a software application (e.g., a bootloader) that may be adapted to obtain the replacement management entity. The trusted recovery manager may be obtained using out-of-band methods that may not rely on in-band components or in-band (communication) channels of the data processing system. To do so, the data processing system may include out-of-band components and out-of-band (communication) channels that function independently from the in-band components. Consequently, if the in-band components and/or communication channels are compromised or non-operational, then the out-of-band components and communication channels may remain available, uncompromised, and reliable to obtain and/or implement the trusted recovery manager.

By doing so, embodiments disclosed herein may provide a system for managing recovery of a data processing system using a trusted recovery manager. Out-of-band components of the data processing system (e.g., a management controller) may use the trusted recovery manager to initiate and/or manage a recovery process for the management entity of the data processing system, despite potentially unavailable in-band components of the data processing system.

In an embodiment, a computer-implemented method for managing a data processing system is provided. The method may include identifying, by a management controller of the data processing system, an occurrence of a recovery event for the data processing system that impairs operation of hardware resources of the data processing system.

Based on the identification, the method may include: providing, by the management controller and via an out-of-band channel and to a remote system, a request for a trusted recovery manager for the data processing system; obtaining, by the management controller and via the out-of-band channel and from the remote system, the trusted recovery manager; and, performing, by the management controller, a verification process for the trusted recovery manager to attempt to validate the trusted recovery manager.

The method may also include, in a first instance of the performing where the trusted recovery manager is validated: performing, by the data processing system, a recovery process to manage an impact of the occurrence of the recovery event on the hardware resources using the trusted recovery manager; and, providing, by the data processing system, a computer-implemented service using the hardware resources after the impact is managed.

The recovery event may include a failure of a management entity that manages operation of the hardware resources.

The trusted recovery manager may be adapted to obtain a replacement management entity for the data processing system. The trusted recovery manager may include a cryptographically verifiable data structure, and the data structure may include information usable to initiate the recovery process. The cryptographically verifiable data structure may include a signed image of the trusted recovery manager that is signed using a private key of a trusted public private key pair.

Performing the verification process may include utilizing a public key of the trusted public private key pair to validate that a signature of the signed image is signed using the private key of the trusted public private key pair.

Performing the recovery process may include: providing, by the data processing system and to a second remote system, a request for recovery data for the data processing system, the recovery data being usable to manage the occurrence of the recovery event; obtaining, by the data processing system and from the second remote system, the recovery data; performing, by the data processing system, a second validation process for the recovery data to attempt to validate the recovery data; and, in a first instance of the performing of the second validation process where the recovery data is validated, using the recovery data to complete the recovery process.

The recovery data may include a replacement management entity for the data processing system.

The data processing system may include a network module adapted to separately advertise network endpoints for the management controller and the hardware resources, the network endpoints being usable by remote systems to address communications to the hardware resources and the management controller. The out-of-band channel may run through the network module and an in-band channel that services the hardware resources may also run through the network module.

The management controller and the network module may be on separate power domains from the hardware resources so that the management controller and the network module are operable while the hardware resources are inoperable. The occurrence of the recovery event may be managed while the hardware resources are inoperable due to being unpowered.

A non-transitory media may include instructions that when executed by a processor cause the computer-implemented method to be performed.

The data processing system may include the non-transitory media and a processor, and may perform the computer-implemented method when the computer instructions are executed by the processor.

Figure 1A:
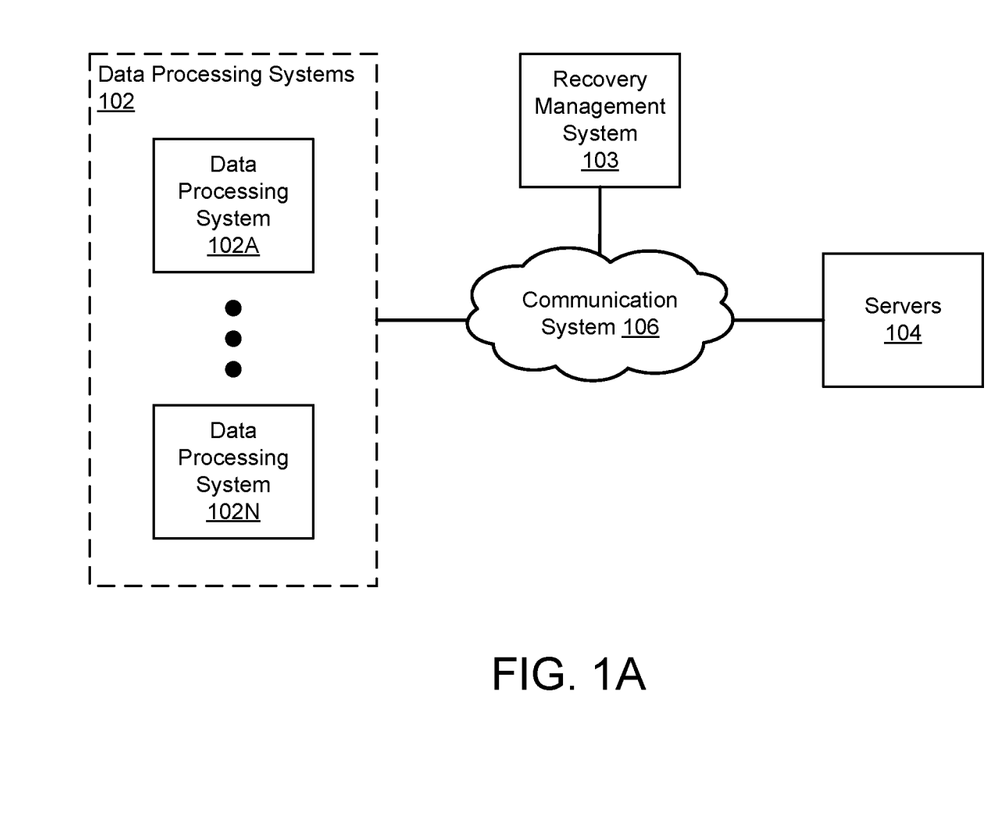
FIG. 1A shows a block diagram illustrating a distributed system in accordance with an embodiment.

Turning to FIG. 1A, a block diagram illustrating a distributed system in accordance with an embodiment is shown. The (distributed) system shown in FIG. 1A may provide computer-implemented services. The computer-implemented services may include any type and quantity of services including, for example, data services (e.g., data storage, access and/or control services), communication services (e.g., instant messaging services, video-conferencing services), and/or any other type of service that may be implemented with a computing device.

The computer-implemented services may be provided by one or more components of the system of FIG. 1A. The computer-implemented services may be provided by, for example, data processing systems 102, recovery management system 103, servers 104, and/or any other type of devices (not shown in FIG. 1A). The system may include any number of data processing systems 102 (e.g., computing devices) that may each include any number of hardware components (e.g., processors, memory modules, storage devices, communications devices). The hardware components may support execution of any number and types of applications (e.g., software components).

For example, a data processing system (e.g., 102A) may include hardware resources that, when operated in an expected manner, provide at least a portion of the computer-implemented services. A management entity, such as an operating system, may manage operation of the hardware resources and/or software hosted by the hardware resources.

However, for various reasons, the data processing system may experience an occurrence of a recovery event. The recovery event may include any event that may result in loss of functionality of the data processing system, loss of data accessible to the data processing system, etc., and that therefore may warrant recovery of the functionality, of the data, etc. For example, the recovery event may include a failure of the management entity of the data processing system, causing the management entity to be (locally) unrecoverable and resulting in an impairment of the hardware resources. To avoid lengthy disruptions to the provision of computer-implemented services by the data processing system, the management entity may be restored (e.g., recovered from a remote entity).

For example, the management entity may be restored by providing a replacement management entity to the data processing system. However, to obtain the replacement management entity, the data processing system may rely on (i) user intervention (e.g., to load the system from a bootable external drive), (ii) an operable and/or secure in-band network connection, and/or (iii) operation of the management entity, which may not be feasible for remote data processing systems with failed management entities (e.g., impaired hardware resources). Therefore, to manage impacts of a failure of a management entity in a timely, secure, and efficient manner, operation of the data processing system may be managed using out-of-band methods.

In general, embodiments disclosed herein may provide methods, systems, and/or devices for managing recovery of a data processing system using out-of-band methods. The data processing system may include out-of-band components (e.g., a management controller) that may communicate with remote systems without traversing in-band channels and without utilizing in-band components. For example, the out-of-band components may request, obtain and/or verify a trusted recovery manager for the data processing system independently from inoperable in-band components and potentially compromised in-band channels. The out-of-band components may use the verified trusted recovery manager to initiate a recovery process during which a replacement management entity for the data processing may be obtained. By doing so, the inoperable in-band components and potentially unsecure in-band channels may be circumvented, increasing the likelihood of effectively managing impacts of recovery events for the data processing system.

To perform the above-mentioned functionality, the system of FIG. 1A may include data processing systems 102, recovery management system 103, and/or servers 104. Data processing systems 102, recovery management system 103, service systems 104, and/or any other type of devices not shown in FIG. 1A may perform all, or a portion of the computer-implemented services independently and/or cooperatively. Each of these components is discussed below.

Data processing systems 102 may include any number and/or type of data processing systems (e.g., 102A-102N). Any of data processing systems 102 may include in-band components (e.g., hardware resources) and out-of-band components (e.g., a management controller, a network module, etc.), and functionality that may allow the out-of-band components to interact with remote systems independently from the in-band components. For more information regarding out-of-band components of data processing systems 102, refer to the discussion of FIG. 1B.

To manage recovery events, for example, out-of-band components such as a management controller of a data processing system (e.g., 102A) may (i) identify a recovery event for the data processing system (e.g., a failure of a management entity of the data processing system, via a sideband channel established between the management controller and the hardware resources), (ii) communicate with remote systems to request and/or obtain data (e.g., a trusted recovery manager, via out-of-band channels established between the management controller and the remote system), (iii) perform verification processes for data obtained from the remote systems (e.g., to authenticate the remote systems and/or the trusted recovery manager), (iv) initiate a recovery process for the data processing system (e.g., using the trusted recovery manager, via the sideband channel) to manage an impact of the recovery event, and/or (v) perform other actions (e.g., that may relate to facilitating the data processing system providing computer-implemented services).

In-band components (e.g., hardware resources) of the data processing system may, for example, (i) communicate with remote systems (e.g., recovery management system 103, via in-band channels established between the hardware resources and recovery management system 103) in order to provide requests for and/or obtain recovery data (e.g., a replacement management entity), (ii) exchange data with the out-of-band components (e.g., in order to verify the recovery data, via the sideband channel), (iii) perform startup processes for the data processing system (e.g., using the recovery data), and/or (iv) perform other actions (e.g., provide and/or facilitate provision of and/or provide computer-implemented services).

Servers 104 may include any number and/or type of systems and may be implemented using any number of physical devices including an IoT hub. The IoT hub may include a message broker service that directs communications between the components of FIG. 1A and/or IoT devices that may provide computer-implemented services (e.g., Cloud-based services). For example, the IoT hub may be responsible for providing communications from a management controller of data processing system 102A to a remote system that may manage (e.g., store) a trusted recovery manager of data processing system 102A.

The communications between servers 104 and data processing systems 102 may include out-of-band communications, and therefore the communications may occur independently from and may be more reliable than in-band components and channels of data processing systems 102. For example, data processing system 102A may request and obtain the trusted recovery manager from servers 104 via an out-of-band channel upon identifying an occurrence of a recovery event. The trusted recovery manager may be used to initiate operation of hardware resources of data processing system 102A, allowing data processing system 102A to interact with recovery management system 103.

Recovery management system 103 may include any number and/or type of systems (e.g., physical devices) that may provide computer-implemented services, such as data services for data processing systems 102. To provide the data services, recovery management system 103 may store and/or manage recovery data for (and other information related to) data processing systems 102. Communications between recovery management system 103 and data processing systems 102 may include in-band communications. For example, to provide its functionality, recovery management system 103 may obtain and/or respond to requests for recovery data for data processing system 102A (e.g., during a recovery process for data processing system 102A). The content of the recovery data may be verifiable by data processing system 102A and may include a replacement management entity for data processing system 102A.

Thus, recovery of data processing systems 102 may be initiated using out-of-band methods. Recovery events may be more likely to be detected and responded to (e.g., in a timely manner) when implementing the out-of-band methods versus in-band methods that may rely on the availability (e.g., operability, security) of in-band components and in-band channels. By doing so, impacts of occurrences of the recovery events for data processing systems 102 may be more likely to be mitigated and/or prevented.

Figure 3:
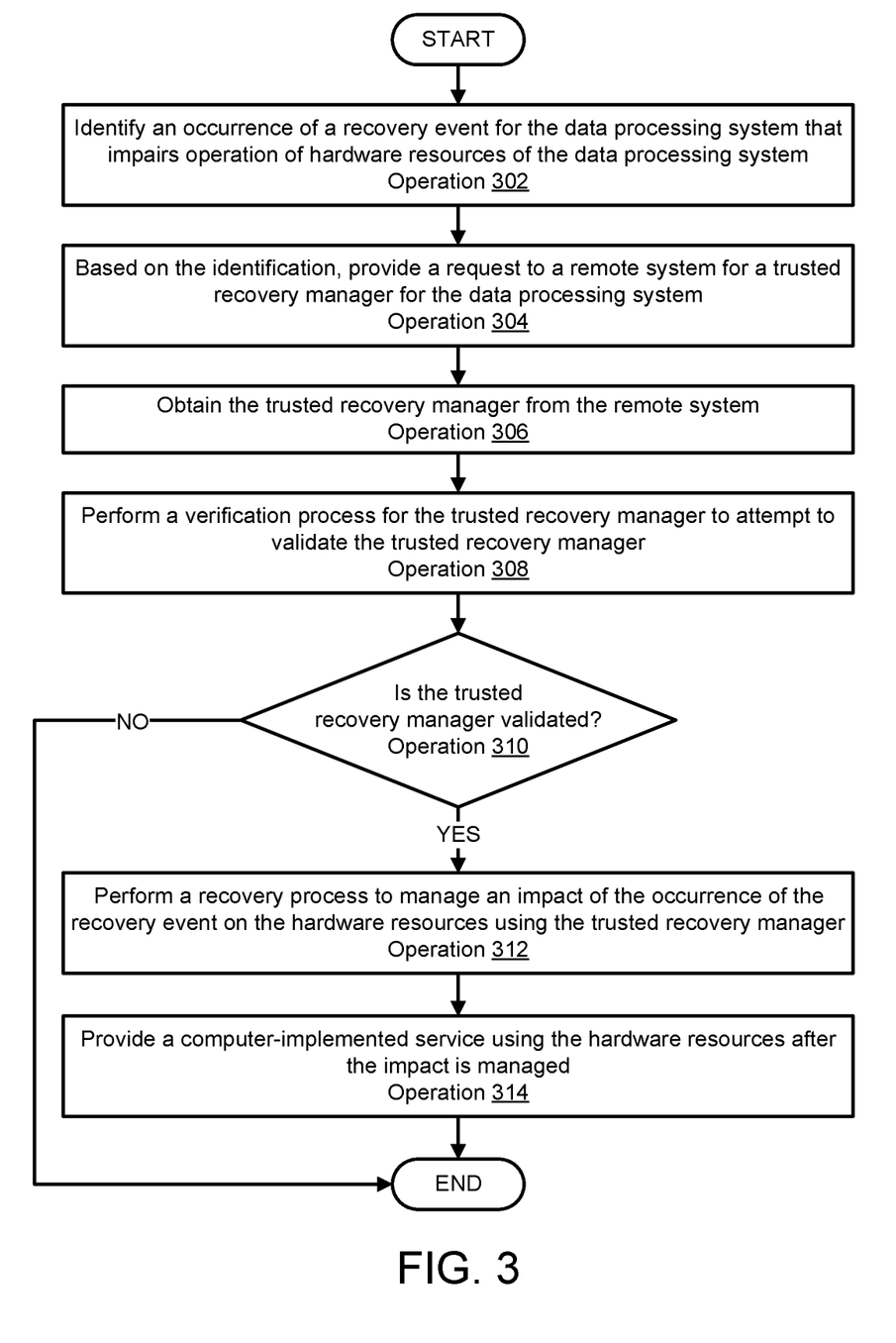
FIG. 3 shows a flow diagram illustrating a method in accordance with an embodiment.

When providing their functionality, any of data processing systems 102, recovery management system 103, and/or servers 104 may perform all, or a portion of the method shown in FIG. 3.

Any of (and/or components thereof) data processing systems 102, recovery management system 103, and/or service systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing systems 102, recovery management system 103, and/or service systems 104 are implemented using an internet of things (IoT) device, which may include a computing device. The IoT device may operate in accordance with a communication model and/or management model known to data processing systems 102, recovery management system 103, service systems 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol).

While illustrated in FIG. 1A as including a limited number of specific components, a system in accordance with an embodiment may include fewer, additional, and/or different components than those illustrated therein.

Figure 1B:
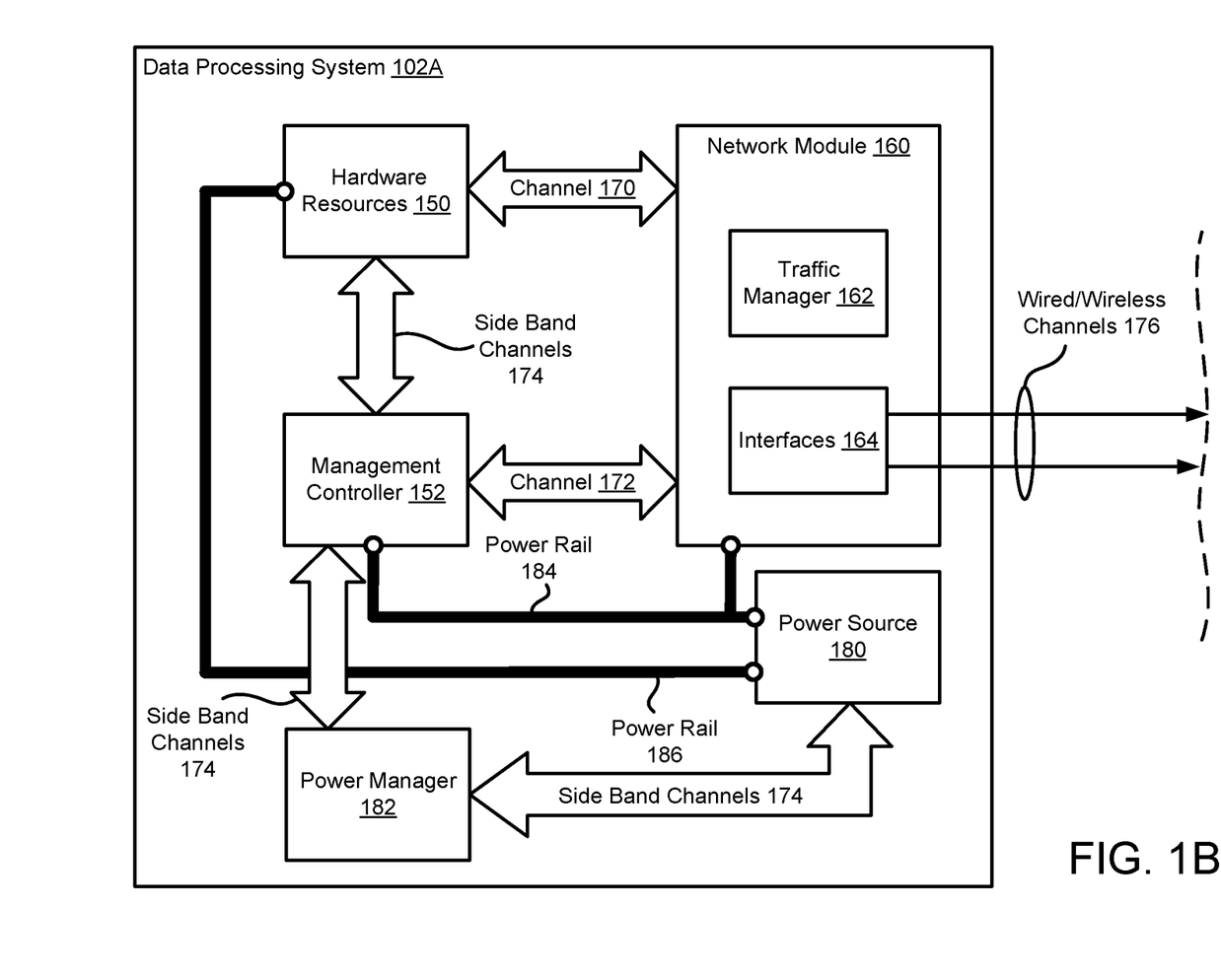
FIG. 1B shows a block diagram illustrating a data processing system in accordance with an embodiment.

Turning to FIG. 1B, a diagram illustrating a data processing system in accordance with an embodiment is shown. Data processing system 102A shown in FIG. 1B may be similar to any of the computing devices shown in FIG. 1A (e.g., one of data processing systems 102).

To provide computer-implemented services, data processing system 102A may include any quantity of hardware resources 150. Hardware resources 150 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

Figure 2:
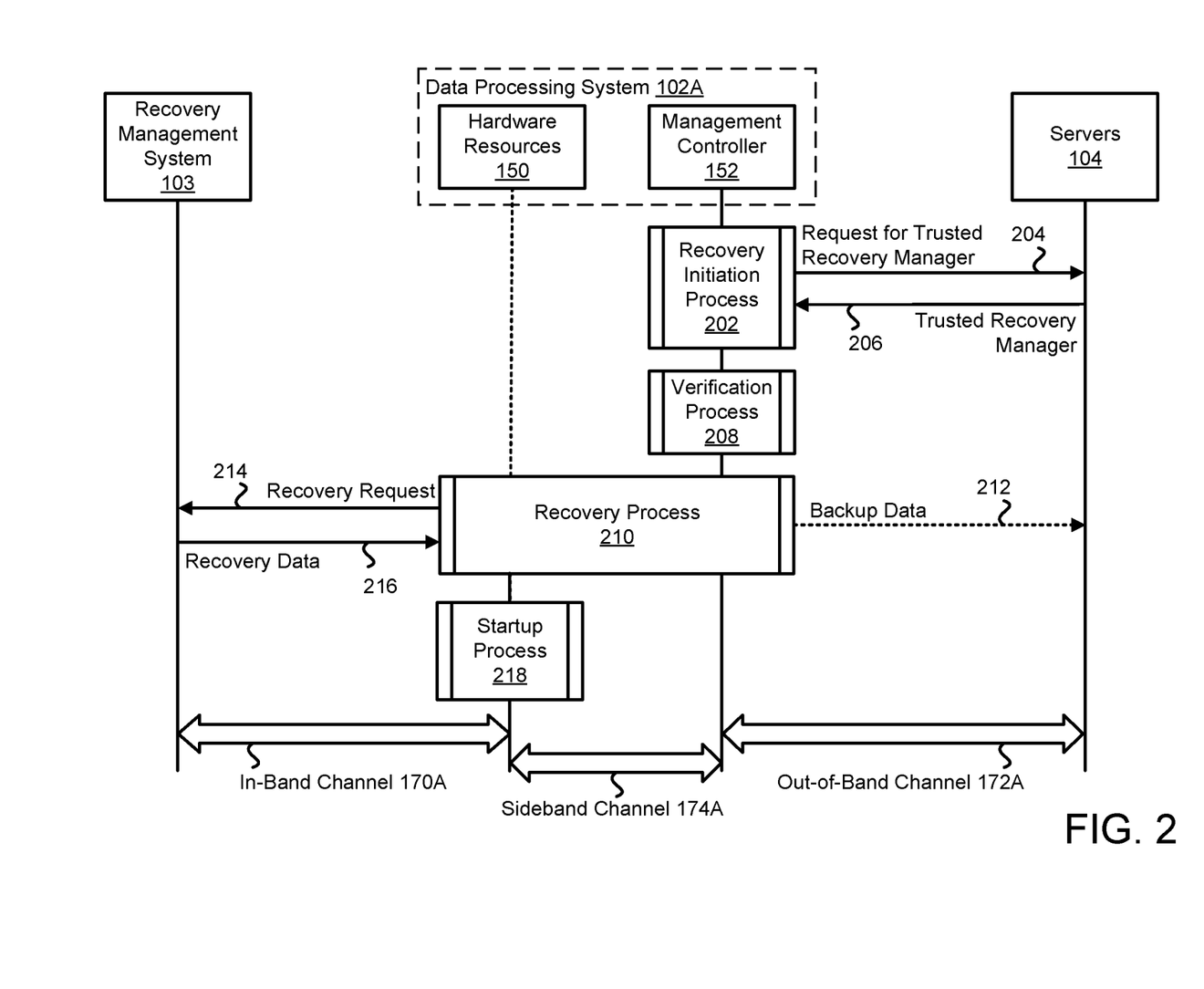
FIG. 2 shows an interaction diagram in accordance with an embodiment.

For example, to communicate with other entities, an application may generate and send communications to a network stack and/or driver, which may subsequently transmit a packaged form of the communication via channel 170 (e.g., or 170A as shown in FIG. 2) to a communication component, which may then send the packaged communication (in a yet further packaged form, in some embodiments, with various layers of encapsulation being added depending on the network environment outside of data processing system 102A) to another device via any number of intermediate networks (e.g., via wired/wireless channels 176 that are part of the networks).

To reduce the likelihood of the applications and/or other in-band entities from being indirectly compromised, data processing system 102A may include management controller 152 and network module 160. Each of these components of data processing system 102A is discussed below.

Management controller 152 may be implemented, for example, using a system on a chip or other type of independently operating computing device (e.g., independent from the in-band components, such as hardware resources 150 of a host data processing system 102A). Management controller 152 may provide various management functionalities for data processing system 102A. Management controller 152 may, for example, monitor various ongoing processes performed by the in-band components, may manage power distribution, thermal management, and/or may perform other functions for managing data processing system 102A. For example, management controller 152 may monitor various ongoing processes to identify a failure of a management entity of data processing system 102A, and in response, may also manage power distribution to manage an impact of the failure.

To do so, management controller 152 may be operably connected to various components via sideband channels 174 (in FIG. 1B, a limited number of sideband channels are included for illustrative purposes, it will be appreciated that management controller 152 may communicate with other components via any number of sideband channels such as 174A shown in FIG. 2). The sideband channels may be implemented using separate physical channels, and/or with a logical channel overlay over existing physical channels (e.g., logical division of in-band channels). The sideband channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152.

Management controller 152 may then, for example, send the information via sideband channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 152 may be operably connected to communication components of data processing system 102A via separate channels (e.g., 172, 172A shown in FIG. 2) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted components may not result in indirect compromise of any management controller 152, and entities hosted by management controller 152.

To facilitate communication with other devices, data processing system 102A may include network module 160. Network module 160 may provide communication services for in-band components and out-of-band components (e.g., management controller 152) of data processing system 102A. To do so, network module 160 may include traffic manager 162, and interfaces 164.

Traffic manager 162 may include functionality to (i) discriminate traffic directed to various network endpoints advertised by data processing system 102A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

For example, during communications with a remote system (e.g., servers 104), messages from the remote system may be addressed to a network endpoint advertised by network module 160 for out-of-band communications. The message may include information needed to manage occurrences of recovery events for data processing system 102A, such as a trusted recovery manager. Once the message is received by traffic manager 162, traffic manager 162 may forward the message to management controller 152 via an out-of-band communication channel (e.g., channel 172), differentiating the message from in-band communications to data processing system 102A. The message obtained by data processing system 102A using out-of-band methods may be more likely to be obtained (e.g., securely obtained) by data processing system 102A than when using in-band methods that may be unavailable or compromised.

To support inbound and outbound traffic, network module 160 may include any number of interfaces 164. Interfaces 164 may be implemented using any number and type of communication devices which may each provide wired and/or wireless communication functionality. For example, interfaces 164 may include a wireless wide area network (WWAN) card, a Wi-Fi card, a wireless local area network card, a wired local area network card, an optical communication card, and/or other types of communication components. These component may support any number of wired/wireless channels 176.

Thus, from the perspective of an external device, the in-band components and out-of-band components of data processing system 102A may appear to be two independent network entities that may be independently addressable and/or otherwise unrelated to one another.

To facilitate management of data processing system 102A over time, hardware resources 150, management controller 152 and/or network module 160 may be positioned in separately controllable power domains. By being positioned in these separate power domains, different subsets of these components may remain powered while other subsets are unpowered.

For example, management controller 152 and network module 160 may remain powered while hardware resources 150 is unpowered. Consequently, management controller 152 may remain able to communicate with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

Therefore, if hardware resources 150 become unavailable (e.g., due to being unpowered) then out-of-band components may remain powered, allowing management of recovery events while hardware resources 150 are inoperable. For example, management controller 152 may communicate with remote devices in order to obtain information usable to manage the recovery event, authenticate the information, and/or initiate recovery processes using the information.

To implement the separate power domains, data processing system 102A may include a power source (e.g., 180) that separately supplies power to power rails (e.g., power rail 184, power rail 186) that power the respective power domains. Power from the power source (e.g., a power supply, battery, etc.) may be selectively provided to the separate power rails to selectively power the different power domains. A power manager (e.g., 182) may manage power from power source 180, supplied via the power rails (e.g., by providing instructions via sideband channels 174). Management controller 152 may cooperate with power manager 182 to manage supply of power to these power domains. Management controller 152 may communicate with power manager 182 via sideband channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

To further clarify embodiments disclosed herein, an interaction diagram in accordance with an embodiment is shown in FIG. 2. The interaction diagram may illustrate an example of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 103, 150, etc.), located towards the top of each figure. Lines descend from these shapes. Processes performed by the components of the system are illustrated using a second set of shapes (e.g., 202, 208 etc.) superimposed over these lines. A portion of the line descending from hardware resources 150 is drawn in dashing to indicate that hardware resources 150 may be unavailable.

Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines are drawn in dashing (e.g., between management controller 152 and servers 104)

to indicate that the interactions are optional and/or may depend on policies of data processing system 102A.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

The processes shown in FIG. 2 may be performed by any entity shown in the systems of FIGS. 1A-1B (e.g., a device similar to one of data processing systems 102, systems similar to recovery management system 103, etc.) and/or another entity without departing from embodiments disclosed herein.

Turning to FIG. 2, an interaction diagram in accordance with an embodiment is shown. The interaction diagram may illustrate processes and interactions that may occur when managing recovery of a data processing system. For example, data processing system 102A may provide computer-implemented services. As discussed with respect to FIGS. 1A-1B, data processing system 102A may include hardware resources 150 and management controller 152. Data processing system 102A may provide the computer-implemented services while a management entity (e.g., an operating system) of data processing system 102A manages operation of hardware resources 150. However, the management entity may fail which may cause data processing system 102A to be unable to provide the computer-implemented services.

The failure of the management entity may render hardware resources 150 inoperable (e.g., indicated by the dashed line descending from hardware resources 150). As management controller 152 may remain operable despite impaired operation of hardware resources 150, management controller 152 may identify the occurrence of the failure. The occurrence of the failure may prompt management controller 152 to initiate a recovery process for the management entity of data processing system 102A.

Management controller 152 may initiate and/or perform recovery initiation process 202 while hardware resources 150 are inoperable. Recovery initiation process 202 may be initiated and/or performed automatically based on the identification of the failure and/or for other reasons. Recovery process 202 may include obtaining a request for a trusted recovery manager for data processing system 102A. The request (for the trusted recovery manager) may include, for example, (i) a message indicating that the trusted recovery manager is requested, (ii) a device identifier for data processing system 102A, and/or (iii) other data (e.g., authentication information, information regarding the failure, etc.).

At interaction 204, the request (for the trusted recovery manager) may be provided to servers 104 (e.g., via an IoT hub of servers 104) by management controller 152. For example, the request may be generated by management controller 152 and may be provided to servers 104 via out-of-band channel 172A through (i) transmission via a message, (ii) storing in a storage with subsequent retrieval by servers 104, (iii) a publish-subscribe system where servers 104 subscribes to updates from management controller 152 thereby causing a copy of the request to be propagated to servers 104, and/or (iv) other processes. By providing the request to servers 104, servers 104 may assist in initiating recovery of data processing system 102A.

Using information included in the request, servers 104 may (i) perform authentication processes for data processing system 102A and/or the request, (ii) identify the trusted recovery manager usable in managing the failure, (iii) identify policies for data processing system 102A that may specify whether data should be requested from data processing system 102A (e.g., a backup of critical data stored by data processing system 102A), and/or (iv) perform other actions (e.g., according to policies for data processing system 102A). Servers 104 may respond to the request by obtaining (e.g., generating) a data package that may include the trusted recovery manager.

The trusted recovery manager may include a cryptographically verifiable data structure that includes information usable to initiate a recovery process for data processing system 102A. For example, the data structure may include a signed image of the trusted recovery manager that is signed using a private key of a trusted private key pair. In other words, the trusted recovery manager may be generated so that it may be authenticated by management controller 152 during a verification process.

At interaction 206, the data package (e.g., the trusted recovery manager) may be provided to management controller 152 by servers 104 (e.g., via the IoT hub). For example, the trusted recovery manager may be provided to management controller 152 via out-of-band channel 172A through (i) transmission via a message, (ii) storing in a storage with subsequent retrieval by management controller 152, (iii) a publish-subscribe system where management controller 152 subscribes to updates from servers 104 thereby causing a copy of the trusted recovery manager to be propagated to management controller 152, and/or (iv) other processes.

Upon obtaining the trusted recovery manager, management controller 152 may perform verification process 208. Verification process 208 may be performed while hardware resources 150 are inoperable. Verification process 208 may include authenticating servers 104 and/or the provided data package (e.g., the trusted recovery manager). For example, during verification process 208, management controller 152 may utilize a public key of the trusted public private key pair to validate that a signature of the signed image is signed using the private key of the trusted public private key pair in order to verify the identity of servers 104 and/or to verify the integrity of the trusted recovery manager. Once management controller 152 is able to validate the trusted recovery manager, management controller 152 may use the trusted recovery manager to initiate recovery process 210.

Recovery process 210 may be initiated by executing instructions (e.g., software) included in the trusted recovery manager. Portions of recovery process 210 may be performed by management controller 152 independently from and/or in conjunction with hardware resources 150 (e.g., via communications across sideband channel 174A). For example, the trusted recovery manager may include a bootloader (e.g., a bootstrap loader) and management controller 152 may manage power to hardware resources 150 and execute (e.g., run) the bootloader in order to initialize portions of hardware resources 150. The portions of hardware resources 150 may include, for example, components usable to access data stored by hardware resources 150 (e.g., for backup purposes) and/or components usable to establish in-band communication with remote devices.

During recovery process 210 (e.g., upon initiation of recovery process 210), management controller 152 may prepare data stored in hardware resources 150 for backup (e.g., may generate a data backup package). For example, management controller 152 may identify data that is to be backed up based on policies for data processing system 102A and/or based on information obtained from servers 104 at interaction 206 (e.g., regarding backup of critical data). Thus, recovery process 210 may include obtaining backup data (e.g., generating a backup data package that may include the backup data, identifying information, authentication information, instructions).

At interaction 212, the backup data may be provided to servers 104 by management controller 152. For example, the backup data may be provided to servers 104 via out-of-band channel 172A through (i) transmission via a message, (ii) storing in a storage with subsequent retrieval by servers 104, (iii) a publish-subscribe system where servers 104 subscribes to updates from management controller 152 thereby causing a copy of the backup data to be propagated to servers 104, and/or (iv) other processes. Upon obtaining the backup data, servers 104 may perform data backup services in order to manage and/or store the backup data (e.g., critical data).

Returning to recovery process 210, where portions of hardware resources 150 may be initialized, recovery process 210 may include obtaining (e.g., by data processing system 102A) a recovery request. The recovery request may include, for example, (i) a message indicating that recovery data for data processing system 102A is requested, (ii) identifying information (e.g., a device identifier for data processing system 102A, a user identifier for a user of data processing system 102A), and/or (iii) other data (e.g., authentication information).

At interaction 214, the recovery request may be provided to recovery management system 103 by data processing system 102A. For example, the recovery request may be generated by data processing system 102A and may be provided to recovery management system 103 via in-band channel 170A through (i) transmission via a message, (ii) storing in a storage with subsequent retrieval by recovery management system 103, (iii) a publish-subscribe system where recovery management system 103 subscribes to updates from data processing system 102A thereby causing a copy of the recovery request to be propagated to recovery management system 103, and/or (iv) other processes. Upon obtaining the recovery request, recovery management system 103 may provide data recovery services for data processing system 102A.

Upon obtaining the recovery request, recovery management system 103 may authenticate data processing system 102A and/or the recovery request. Once authenticated, recovery management system 103 may respond to the recovery request by identifying recovery data for data processing system 102A (e.g., using information included in the recovery request) and providing the recovery data to data processing system 102A. The recovery data (e.g., a data package) may include a cryptographically verifiable data structure so that it may be validated by data processing system 102A upon receipt (e.g., using a public key of a trusted public private key pair). The trusted public private key pair may, for example, be generated by recovery management system 103 and/or by another trusted entity (e.g., a manufacturer of data processing system 102A). The data structure may include a replacement management entity for data processing system 102A and/or other information (e.g., a public key certificate for verifying integrity of the data structure).

At interaction 216, the recovery data may be provided to data processing system 102A by recovery management system 103. For example, the recovery data may be provided to data processing system 102A via in-band channel 170A through (i) transmission via a message, (ii) storing in a storage with subsequent retrieval by data processing system 102A, (iii) a publish-subscribe system where data processing system 102A subscribes to updates from recovery management system 103 thereby causing a copy of the recovery data to be propagated to data processing system 102A, and/or (iv) other processes. By obtaining the recovery data, data processing system 102A may complete the recovery process.

Once again returning to recovery process 210, recovery process 210 may include performing a verification process similar to verification process 208 in order to authenticate recovery management system 103 and/or the recovery data. Upon validating the recovery data, data processing system 102A may have obtained the replacement management entity usable to recover desired operation of hardware resources 150. Recovery process 210 may include storing a portion of the recovery data in hardware resources 150 so that data processing system 102A may perform a startup process using the replacement management entity.

Startup process 218 may be performed by data processing system 102A. During startup process 200, hardware resources 150 may perform a secure process where (i) a hardware loadout, (ii) software components, (iii) configuration of hardware/software components and/or (iv) other entities are powered and prepared for handoff to management by the replacement management entity. For example, a startup management entity may begin to execute and may perform various actions to place hardware resources 150 in condition to handoff to the management entity.

During startup process 218, various validation actions may be performed. For example, computer instructions for various software applications may be validated using images, keys, and/or other data structures stored in various repositories managed in part using a trusted platform module (TPM) of data processing system 102A (e.g., which may verify the content of the repositories, and limit use of secrets/other data structures depending on the extent to which the repositories and/or other data structures may be validated such as through hash matching). Similar validations may be performed for configurations of hardware/software components and/or other data structures.

Startup process 218 may complete when operation of hardware resources 150 are under management of the replacement management entity. Following the completion of startup process 218, data processing system 102A may be able to provide expected computer-implemented services.

Thus, as shown in the example of FIG. 2, recovery of a data processing system may be managed using a trusted recovery managed obtained via out-of-band methods. Out-of-band components of the data processing system may identify and respond to recovery events for the data processing system automatically and/or in real-time, without user intervention, without presence of a management entity, and/or when the data processing system is powered off (or in a low-powered state). By doing so, impacts of the recovery events may be managed without relying on user intervention and/or functionality of in-band components of the data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes.

Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to manage recovery events for data processing systems using out-of-band methods. By doing so, impacts of the recovery events of the data processing systems may be managed (e.g., reduced, prevented) in a timely and trustworthy manner.

FIG. 3 illustrates a method that may be performed by the components of the system of FIGS. 1A-2. In the diagrams discussed below and shown in FIG. 3, any of the operations may be repeated, performed in different orders, and/or performed in parallel with or in a partially overlapping in time manner with other operations. The method described with respect to FIG. 3 may be performed by a data processing system (e.g., data processing system 102A) and/or another device.

At operation 302, an occurrence of a recovery event for a data processing system may be identified. The occurrence of the recovery event may impair operation of hardware resources of the data processing system. The occurrence may be identified by (i) reading an error message (e.g., generated due to the recovery event), (ii) monitoring activity of the hardware resources to identify a change (e.g., impairment) in their operation, and/or (iii) by other methods.

For example, the recovery event may include a failure of a management entity of the data processing system that manages operation of the hardware resources (e.g., an operating system). The failure of the management entity may be identified, for example, by a management controller of the data processing system by (i) snooping activity of the hardware resources, (ii) obtaining (e.g., fetching, receiving, via a sideband channel connecting hardware resources to the management controller) a message indicating that the failure has occurred, and/or (iii) reading the content of the message.

After the occurrence of the recovery event, the management entity (e.g., an operating system of the data processing system) may not perform as expected. For example, the operating system may not load, may be unavailable, and/or may otherwise be (locally) unrecoverable (e.g., due to corruption or other unexpected modifications to data stored by the data processing system).

At operation 304, based on the identification, a request for a trusted recovery manager for the data processing system may be provided to a remote system. The request may be provided to the remote system (e.g., servers 104) using methods similar to those described with respect to FIG. 2 (e.g., interaction 204) and/or by other methods. For example, the request may be generated by the management controller based on (e.g., in response to) the identification of the occurrence of the failure of the management entity.

The request may include recovery event information (e.g., information relating to the recovery event that may be generated before and/or during the occurrence of the recovery event). The management controller may obtain the recovery event information from the hardware resources via a sideband channel. For example, the management controller may read data from storage and/or snoop activity of the hardware resources to obtain a portion the recovery event information. The request may be provided to the remote system via a secure out-of-band channel established between the remote system and the management controller.

At operation 306, the trusted recovery manager may be obtained from the remote system. The trusted recovery manager may be obtained using methods similar to those described with respect to FIG. 2 (e.g., interaction 206) and/or by other methods. For example, the management controller may obtain the trusted recovery manager via the out-of-band channel.

The trusted recovery manager may be adapted to obtain a replacement management entity for the data processing system (e.g., to replace the failed and/or unrecoverable management entity). The trusted recovery manager may include information usable to initiate a recovery process for the failed management entity. For example, the trusted recovery manager may include a bootloader. The trusted recovery manager may include a cryptographically verifiable data structure, such as a signed image of the of the trusted recovery manager. The signed image may be signed using a private key of a trusted public private key pair, so that the trusted recovery manager may be verified by components of the data processing system upon receipt.

At operation 308, a verification process for the trusted recovery manager may be performed to attempt to validate the trusted recovery manager. The verification process may be performed using methods similar to those described with respect to FIG. 2 (e.g., verification process 208) and/or by other methods. For example, the verification process may be performed by (i) identifying and/or obtaining a public key of the trusted public private key pair, and (ii) authenticating the trusted recovery manager using the public key. The verification process may be performed by the management controller.

Authenticating the trusted recovery manager may include using the public key to validate that the signed image is signed using the private key of the trusted public private key pair. For example, validating the trusted recovery manager may include verifying that a payload of the trusted recovery manager has not been modified.

At operation 310, a determination may be made regarding whether the trusted recovery manager is validated. The determination may be made by performing the verification process of operation 308. For example, if the signed image is signed using the private key of the trusted public private key pair, then the trusted recovery manager is validated, and the method may proceed to operation 312. Otherwise, the method may end following operation 310.

At operation 312, a recovery process may be performed to manage an impact of the occurrence of the recovery event on the hardware resources using the trusted recovery manager. The recovery process may be performed using methods similar to those described with respect to FIG. 2 (e.g., recovery process 210) and/or by other methods.

For example, the recovery process may be performed by (i) executing at least a portion of computer instructions included in the trusted recovery manager to implement, for example, the bootloader, and (ii) obtaining a request for recovery data usable to manage the occurrence of the recovery event. The request for the recovery data may, for example, be generated during a process initiated and/or managed by the bootloader.

Performing the recovery process may include (i) providing the request for the recovery data to a second remote system (e.g., a management system similar to recovery management system 103), (ii) obtaining the recovery data from the second remote system (e.g., in response to the request for the recovery data), (iii) performing a second validation process for the recovery data to attempt to validate the recovery data, and, if the recovery data is validated, then (iv) using the recovery data to complete the recovery process. Each of these steps is described in detail in FIG. 2.

The recovery data may include the replacement management entity for the data processing system. The replacement management entity may be used to manage an impact of the occurrence of the recovery event. For example, operation of the data processing system may be restored by restoring its failed operating system. For more details regarding performance of the recovery process, refer to the discussion of FIG. 2.

The recovery event may be managed while the hardware resources are inoperable. For example, any portions of operations 302-312 may be performed while a portion of the hardware resources are unpowered, by virtue of some components (e.g., the management controller) of the data processing system (i) being powered independently from hardware resources, and/or (ii) managing power distribution to portions of the hardware resources as needed. Refer to FIG. 1B for more information regarding components of the data processing system.

At operation 314, a computer-implemented service may be provided using the hardware resources after the impact is managed. The computer-implemented service may be provided by performing a startup process for the data processing system using the replacement management entity. Performing the startup process may include loading the replacement management entity and handing off management authority to the replacement management entity. In turn, various applications may be loaded as part of the handoff.

Once the startup process is complete, the hardware resources may host software applications and/or perform various process that may facilitate the provision of the computer-implemented service. For example, the hardware resources may, in part, provide the computer-implemented service by executing instructions provided via the hosted software.

The method may end following operation 314.

As illustrated above, embodiments disclosed herein may provide systems and methods usable to manage recovery events for data processing systems. A recovery process may be initiated in order to manage the recovery event. Initiation and performance of the recovery process may be performed, at least in part, using out-of-band methods so that inoperable in-band components and/or unsecure in-band channels may be circumvented. By doing so, the impacts of occurrences of the recovery events may be managed in a more effective manner than when relying on the in-band methods.

The occurrences of the recovery events may be managed automatically and/or in real-time (e.g., without relying on user intervention), reducing the likelihood of service disruptions, and/or security issues that may arise while managing the recovery events. Accordingly, the disclosed process provides for both an embodiment in computing technology and an improved method for managing the security of data processing systems.

Figure 4:
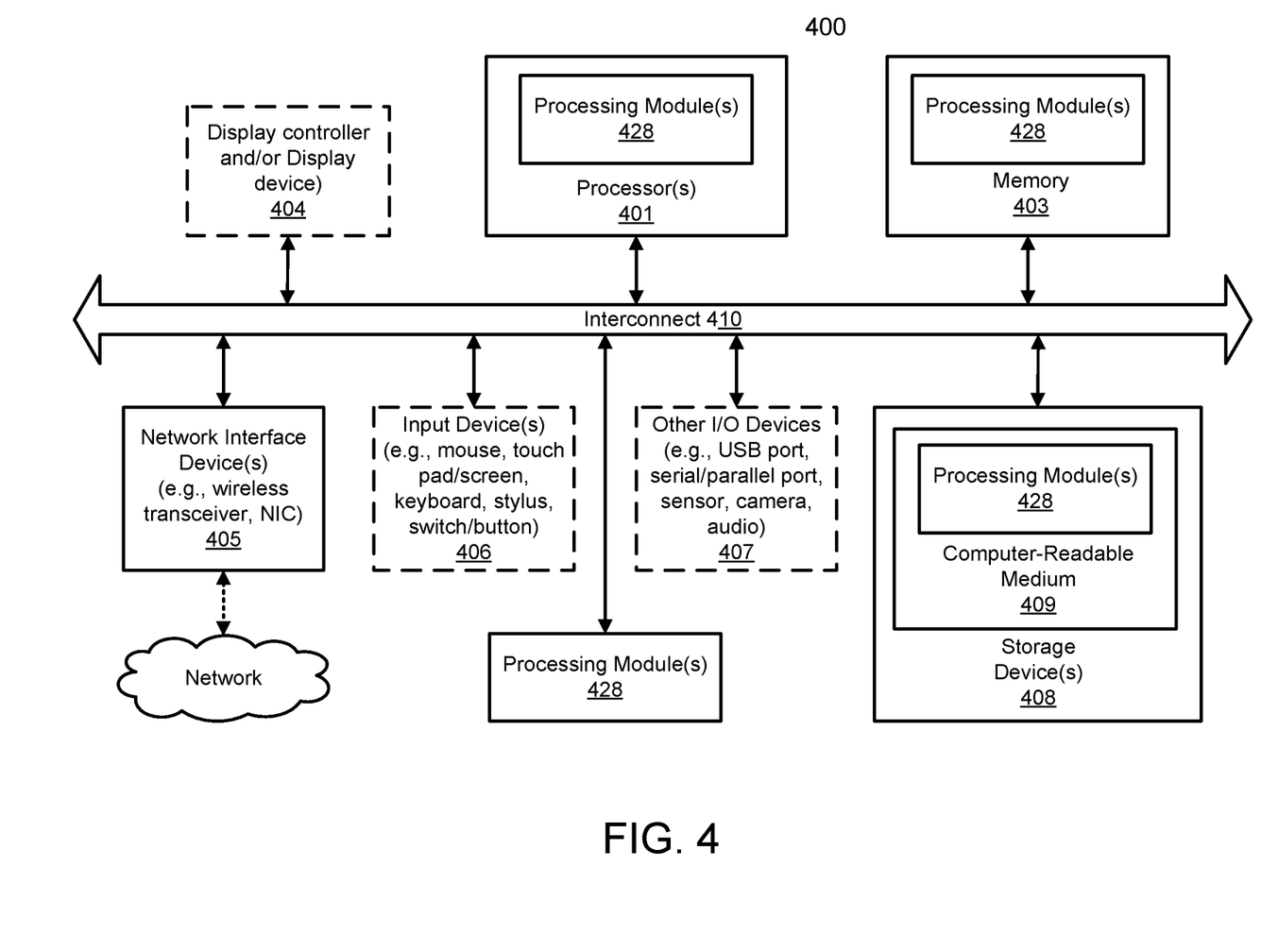
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations.

System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets.

Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device.

For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:
identifying, by a management controller of the data processing system, an occurrence of a recovery event for the data processing system that impairs operation of hardware resources of the data processing system, wherein the data processing system comprises a network module adapted to separately advertise network endpoints for the management controller and the hardware resources, the network endpoints being usable by remote systems to address communications to the hardware resources and the management controller; and
based on the identification:
providing, by the management controller and via an out-of-band channel and to a remote system, a request for a trusted recovery manager for the data processing system,
obtaining, by the management controller and via the out-of-band channel and from the remote system, the trusted recovery manager,
performing, by the management controller, a verification process for the trusted recovery manager to attempt to validate the trusted recovery manager, and
in a first instance of the performing where the trusted recovery manager is validated:
performing, by the data processing system, a recovery process to manage an impact of the occurrence of the recovery event on the hardware resources using the trusted recovery manager; and
providing, by the data processing system, a computer-implemented service using the hardware resources after the impact is managed.

2. The method of claim 1, wherein the recovery event comprises a failure of a management entity that manages operation of the hardware resources.

3. The method of claim 1, wherein the trusted recovery manager is adapted to obtain a replacement management entity for the data processing system.

4. The method of claim 3, wherein the trusted recovery manager comprises a cryptographically verifiable data structure, and the data structure comprises information usable to initiate the recovery process.

5. The method of claim 4, wherein the cryptographically verifiable data structure is a signed image of the trusted recovery manager that is signed using a private key of a trusted public private key pair.

6. The method of claim 5, wherein performing the verification process comprises utilizing a public key of the trusted public private key pair to validate that a signature of the signed image is signed using the private key of the trusted public private key pair.

7. The method of claim 1, wherein performing the recovery process comprises:
providing, by the data processing system and to a second remote system, a request for recovery data for the data processing system, the recovery data being usable to manage the occurrence of the recovery event;
obtaining, by the data processing system and from the second remote system, the recovery data;
performing, by the data processing system, a second validation process for the recovery data to attempt to validate the recovery data; and
in a first instance of the performing of the second validation process where the recovery data is validated:
using the recovery data to complete the recovery process.

8. The method of claim 7, wherein the recovery data comprises a replacement management entity for the data processing system.

9. The method of claim 1, wherein the out-of-band channel runs through the network module and an in-band channel that services the hardware resources also runs through the network module.

10. The method of claim 1, wherein the management controller and the network module are on separate power domains from the hardware resources so that the management controller and the network module are operable while the hardware resources are inoperable.

11. The method of claim 10, wherein the occurrence of the recovery event is managed while the hardware resources are inoperable due to being unpowered.

12. A non-transitory machine-readable medium having instructions stored therein, which when executed by a processor, cause the processor to perform operations for managing a data processing system, the operations comprising:
identifying, by a management controller of the data processing system, an occurrence of a recovery event for the data processing system that impairs operation of hardware resources of the data processing system, wherein the data processing system comprises a network module adapted to separately advertise network endpoints for the management controller and the hardware resources, the network endpoints being usable by remote systems to address communications to the hardware resources and the management controller; and
based on the identification:
providing, by the management controller and via an out-of-band channel and to a remote system, a request for a trusted recovery manager for the data processing system,
obtaining, by the management controller and via the out-of-band channel and from the remote system, the trusted recovery manager,
performing, by the management controller, a verification process for the trusted recovery manager to attempt to validate the trusted recovery manager, and
in a first instance of the performing where the trusted recovery manager is validated:
performing, by the data processing system, a recovery process to manage an impact of the occurrence of the recovery event on the hardware resources using the trusted recovery manager; and
providing, by the data processing system, a computer-implemented service using the hardware resources after the impact is managed.

13. The non-transitory machine-readable medium of claim 12, wherein the recovery event comprises a failure of a management entity that manages operation of the hardware resources.

14. The non-transitory machine-readable medium of claim 12, wherein the trusted recovery manager is adapted to obtain a replacement management entity for the data processing system.

15. The non-transitory machine-readable medium of claim 14, wherein the trusted recovery manager comprises a cryptographically verifiable data structure, and the data structure comprises information usable to initiate the recovery process.

16. A data processing system, comprising:
a processor; and
a memory coupled to the processor to store instructions, which when executed by the processor, cause the processor to perform operations for managing the data processing system, the operations comprising:
identifying, by a management controller of the data processing system, an occurrence of a recovery event for the data processing system that impairs operation of hardware resources of the data processing system, wherein the data processing system comprises a network module adapted to separately advertise network endpoints for the management controller and the hardware resources, the network endpoints being usable by remote systems to address communications to the hardware resources and the management controller, and
based on the identification:
providing, by the management controller and via an out-of-band channel and to a remote system, a request for a trusted recovery manager for the data processing system;
obtaining, by the management controller and via the out-of-band channel and from the remote system, the trusted recovery manager;
performing, by the management controller, a verification process for the trusted recovery manager to attempt to validate the trusted recovery manager; and
in a first instance of the performing where the trusted recovery manager is validated:
performing, by the data processing system, a recovery process to manage an impact of the occurrence of the recovery event on the hardware resources using the trusted recovery manager, and
providing, by the data processing system, a computer-implemented service using the hardware resources after the impact is managed.

17. The data processing system of claim 16, wherein the recovery event comprises a failure of a management entity that manages operation of the hardware resources.

18. The data processing system of claim 16, wherein the trusted recovery manager is adapted to obtain a replacement management entity for the data processing system.

19. The data processing system of claim 18, wherein the trusted recovery manager comprises a cryptographically verifiable data structure, and the data structure comprises information usable to initiate the recovery process.

20. The data processing system of claim 16, wherein the out-of-band channel runs through the network module and an in-band channel that services the hardware resources also runs through the network module.

\* \* \* \* \*